(12) United States Patent
Kasaba et al.

(10) Patent No.: US 8,905,604 B2
(45) Date of Patent: Dec. 9, 2014

(54) VEHICLE LAMP CONTROL APPARATUS

(75) Inventors: Yusuke Kasaba, Shizuoka (JP); Masashi Yamazaki, Shizuoka (JP); Atsushi Toda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 357 days.

(21) Appl. No.: 13/314,287

(22) Filed: Dec. 8, 2011

(65) Prior Publication Data

US 2012/0155098 A1 Jun. 21, 2012

(30) Foreign Application Priority Data

Dec. 15, 2010 (JP) ................... 2010-278894

(51) Int. Cl.
   - *B60Q 1/11* (2006.01)
   - *B60Q 1/12* (2006.01)
   - *B60Q 1/10* (2006.01)
   - *B60Q 11/00* (2006.01)

(52) U.S. Cl.
   CPC ...... *B60Q 1/10* (2013.01); *B60Q 11/00* (2013.01); *B60Q 2200/38* (2013.01); *B60Q 2300/114* (2013.01); *B60Q 2300/132* (2013.01)
   USPC ........... 362/465; 362/459; 362/460; 362/464; 362/466; 315/77; 315/79; 315/80; 315/82

(58) Field of Classification Search
   CPC ........ B60Q 11/00; B60Q 1/10; B60Q 1/1423; B60Q 2200/38; B60Q 2300/056; B60Q 2300/114; B60Q 2300/132; B60Q 9/008
   USPC .......... 315/77, 79, 80, 82; 362/459, 460, 464, 362/465, 466
   See application file for complete search history.

(56) References Cited

U.S. PATENT DOCUMENTS

| | | | |
|---|---|---|---|
| 6,417,642 B2 * | 7/2002 | Ichikawa ............... | 318/638 |
| 6,817,741 B2 * | 11/2004 | Toda et al. ............. | 362/466 |
| 6,915,778 B2 * | 7/2005 | Clemence et al. ...... | 123/361 |
| 2005/0068780 A1 * | 3/2005 | Hayashi ................. | 362/460 |

FOREIGN PATENT DOCUMENTS

| | | |
|---|---|---|
| JP | 2000-085459 | 3/2000 |
| JP | 2001-341578 | 12/2001 |
| JP | 2004-314856 | 11/2004 |
| JP | 2009-126268 | 6/2009 |

* cited by examiner

*Primary Examiner* — Douglas W Owens
*Assistant Examiner* — Thai Pham
(74) *Attorney, Agent, or Firm* — Fish & Richardson P.C.

(57) ABSTRACT

A vehicle lamp control apparatus is provided with: a receiving portion for receiving output values of an acceleration sensor; a control portion for deriving a variation in an inclination angle of a vehicle based on the output values of the acceleration sensor and generating a control signal for instructing an optical axis adjustment of a vehicle lamp; and a transmitting portion for transmitting the control signal to an optical axis adjusting portion of the vehicle lamp. The control portion is configured to detect an error factor of the output values occurring in the acceleration sensor based on the output values of the acceleration sensor and to correct an optical axis position of the vehicle lamp.

8 Claims, 6 Drawing Sheets

VEHICLE LAMP CONTROL APPARATUS

BACKGROUND OF THE INVENTION

1. Field of the Invention

The present invention relates to a control apparatus for a vehicle lamp.

2. Related Art

Conventionally, there is known an auto leveling control which automatically adjusts an optical axis position of a vehicle headlamp according to an inclination angle of a vehicle in its pitch direction to thereby change an illuminating direction of the vehicle headlamp. Generally, in the auto leveling control, as a device for detecting an inclination of the vehicle, there is used a vehicle height sensor and an optical axis position of the headlamp is adjusted according to a vehicle pitch angle detected by the vehicle height sensor. On the other hand, Patent Document 1 discloses a structure which uses a gravity sensor as an inclination detecting device. Also, Patent Document 2 discloses a structure which, as an inclination detecting device, uses a three-dimensional gyro sensor for detecting an inclination angle of the vehicle relative to a horizontal plane. Also, Patent Document 3 discloses a structure which uses, as an inclination detecting device, a clinometer for detecting a vehicle inclination angle relative to a gravitational direction. Further, Patent Document 4 discloses a structure which uses, as an inclination detecting device, an acceleration sensor for detecting the gravity acceleration of the vehicle.

Patent Document 1: JP-A-2000-085459
Patent Document 2: JP-A-2004-314856
Patent Document 3: JP-A-2001-341578
Patent Document 4: JP-A-2009-126268

When the acceleration sensor including the gravity sensor (a three-dimensional gyro sensor or the like) is used as the inclination detecting device for the vehicle, as compared with the structure using the vehicle height sensor, the auto leveling system can be produced at a lower cost and also can be reduced in weight. On the other hand, even when the acceleration sensor is used, there always exists a need to enhance a performance of the auto leveling control. One aspect of the performance of the auto leveling control is the safety of the auto leveling control. That is, the auto leveling control is required to be able to avoid a heavy degradation of a visibility of a driver even when the optical axis position is adjusted wrong by the auto leveling control.

SUMMARY OF THE INVENTION

Embodiments of the invention relate to a vehicle lamp auto leveling control in which an acceleration sensor is used and can carry out higher-performance auto leveling control.

DETAILED DESCRIPTION OF THE EMBODIMENTS

Embodiments of the invention will be described with reference to the accompanying drawings. The same or equivalent composing elements, members and processing respectively shown in the respective drawings are given the same designations and the duplicate description thereof is omitted properly. Further, the embodiments and modifications thereof described herein are not intended to limit the invention but to exemplify the invention, and all features or combinations of the features of the embodiments and/or the modifications are not always essential to the invention.

Figure 1:
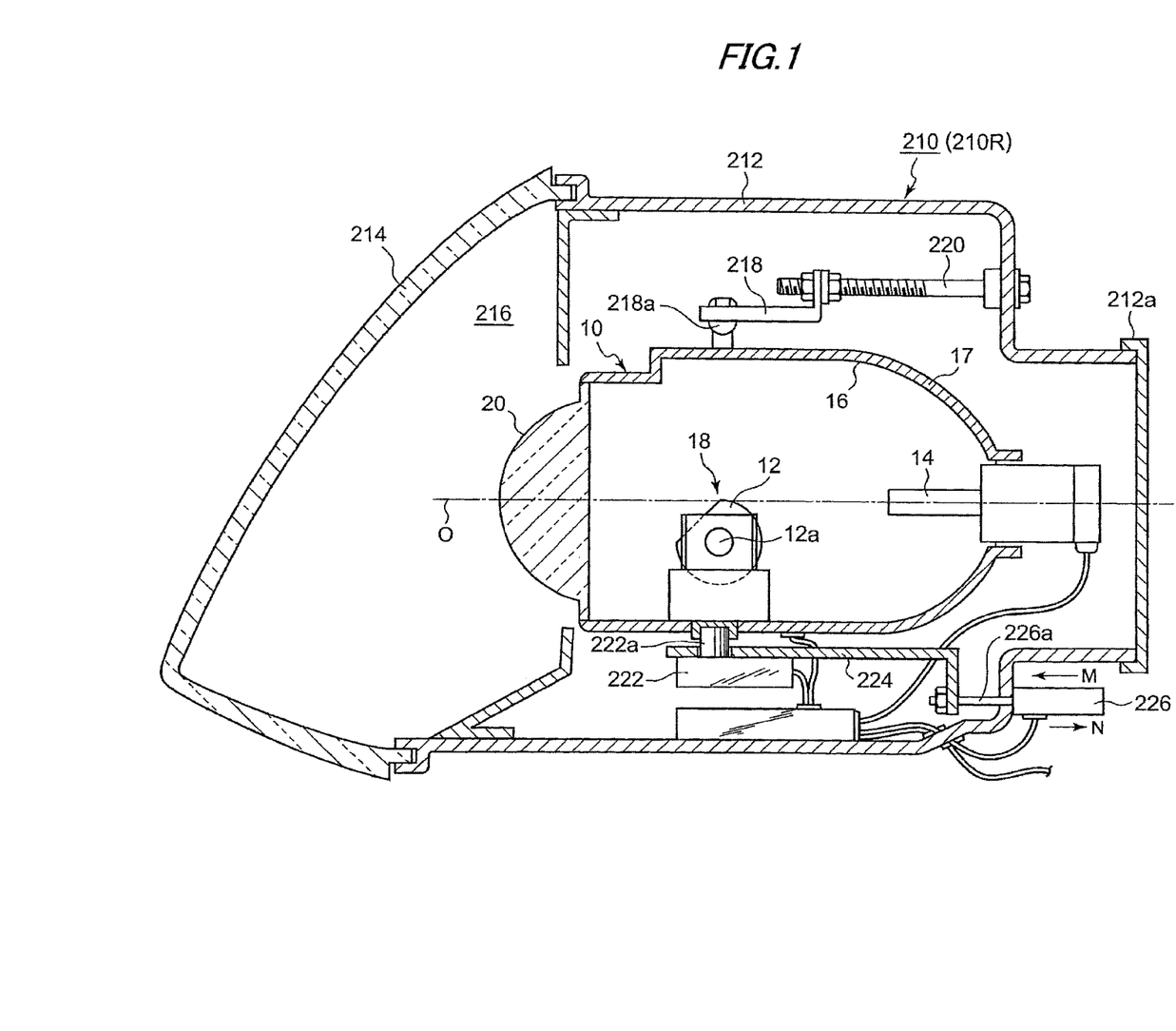
FIG. 1 is a schematic vertical section view of a headlamp unit including a lamp unit to be controlled by a vehicle lamp control apparatus according to an embodiment 1.

FIG. 1 is a schematic vertical section view of a headlamp unit including a lamp unit to be controlled by a vehicle lamp control apparatus according to an embodiment 1. This headlamp unit 210 has a structure where a pair of symmetrically formed headlamp units are respectively disposed on the right and left sides of a vehicle in the vehicle width direction. The right and left headlamps are substantially the same in structure except that they are arranged symmetrically right and left. Therefore, in the following description, the structure of the right headlamp unit 210R will be described, while the description of the left headlamp unit 210L will be omitted properly.

The headlamp 210R includes a lamp body 212 having an opening formed on the vehicle front side and a light penetrable cover 214 for covering this opening. The lamp body 212 includes a removable cover 212a provided on the vehicle rear side thereof and removable when replacing a bulb 14. The lamp body 212 and light penetrable cover 214 cooperate together to define a lamp chamber 216. Within the lamp chamber 216, there is stored a lamp unit 10 (a vehicle lamp) for radiating light forwardly of the vehicle.

In part of the lamp unit 10, there is provided a lamp bracket 218 including a pivot mechanism 218a serving as the center of oscillation of the lamp unit 10 in the vertical and right and left directions thereof. The lamp bracket 218 is threadedly engaged with an aiming adjustment screw 220 rotatably supported on the wall surface of the lamp body 212. Therefore, the lamp unit 10 can be fixed at such a given position within the lamp chamber 216 as is set by the aiming adjustment screw 220 and also the attitude of the lamp unit 10 can be changed into any one of its forwardly, backwardly and otherwise inclined attitudes about the pivot mechanism 218a with such given position as the reference. Also, on the lower surface of the lamp unit 10, there is fixed the rotation shaft 222a of a swivel actuator 222. The swivel actuator 222 is, fixed to a unit bracket 224.

To the unit bracket 224, there is connected a leveling actuator 226 (an optical axis adjusting portion) disposed on the outside of the lamp body 212. The leveling actuator 226 is constituted of, for example, a motor capable of expanding and contracting a rod 226a in the arrows M and N directions. When the rod 226a expands in the arrow M direction, the lamp unit 10 is oscillated about the pivot mechanism 218 to take its backwardly inclined attitude. Oppositely, when the rod 226a contracts in the arrow N direction, the lamp unit 10 is oscillated about the pivot mechanism 218 to take its forwardly inclined attitude. When the lamp unit 10 takes its backwardly inclined attitude, there can be made a leveling adjustment which directs the pitch angle of an optical axis O, that is, is the vertical direction angle of the optical axis O upwardly. Also, when the lamp unit takes its forwardly inclined attitude, there can be made a leveling adjustment which directs the pitch angle of the optical axis O downwardly.

The lamp unit 10 can include an aiming adjustment mechanism. For example, in the connecting portion between the rod 226a of the leveling actuator 226 and unit bracket 224, there is provided an aiming pivot mechanism (not shown) which serves as the oscillation center in the aiming adjustment. Also, on the lamp bracket 218, there is provided the above aiming screw 220 such that it is spaced therefrom in the vehicle width direction, And, by rotating the two aiming adjustment screws 220, the lamp unit 10 can be oscillated vertically and horizontally about the aiming pivot mechanism to thereby be able to adjust the optical axis O vertically and horizontally.

The lamp unit 10 includes a shade mechanism 18 having a rotation shade 12, a bulb 14 serving as a light source, a lamp housing 17 supporting a reflector 16 on the inner wall thereof, and a projection lens 20. The bulb 14 may be constituted of, for example, an incandescent lamp, a halogen lamp, a discharge lamp or an LED. In this embodiment, the bulb 14 is constituted of a halogen lamp. The reflector 16 reflects light radiated from the bulb 14. The light from the bulb 13 and the light reflected by the reflector 16 are in part guided through the rotation shade 12 to the projection lens 20. The rotation shade 12 is a cylindrical-shaped member rotatable about its rotation shaft 12a and includes a cut-out portion cut out in part in the axial direction and multiple shade plates (not shown). In the case that the cut-out portion or shade plates are moved on the optical axis O, there is formed a given light distribution pattern. The reflector 16, at least a portion thereof, has an elliptic spherical surface shape and this elliptic spherical surface is set such that the section shape of the lamp unit 10 including the optical axis O can provide at least a portion of an elliptic shape. The elliptic spherical portion of the reflector 16 has a first focus substantially in the center of the bulb 14 and a second focus existing on the rear focal plane of the projection lens 20.

The projection lens 20 is arranged on the optical axis O extending in the vehicle longitudinal direction. The bulb 14 is disposed backwardly of the rear focal plane including the rear focus of the projection lens 20. The projection lens 20 is constituted of a planoconvex aspherical lens the front side surface of which is a convex surface and the rear side surface of which is a plane. The projection lens 20 projects a light source image, which is formed on the rear focal plane, on a virtual vertical screen provided forwardly of a vehicle lamp system as an inverted image. Here, the structure of the lamp unit 10 is not limited to the above structure but there may also be used a lamp unit of a reflection type excluding the projection lens 20.

Figure 2:
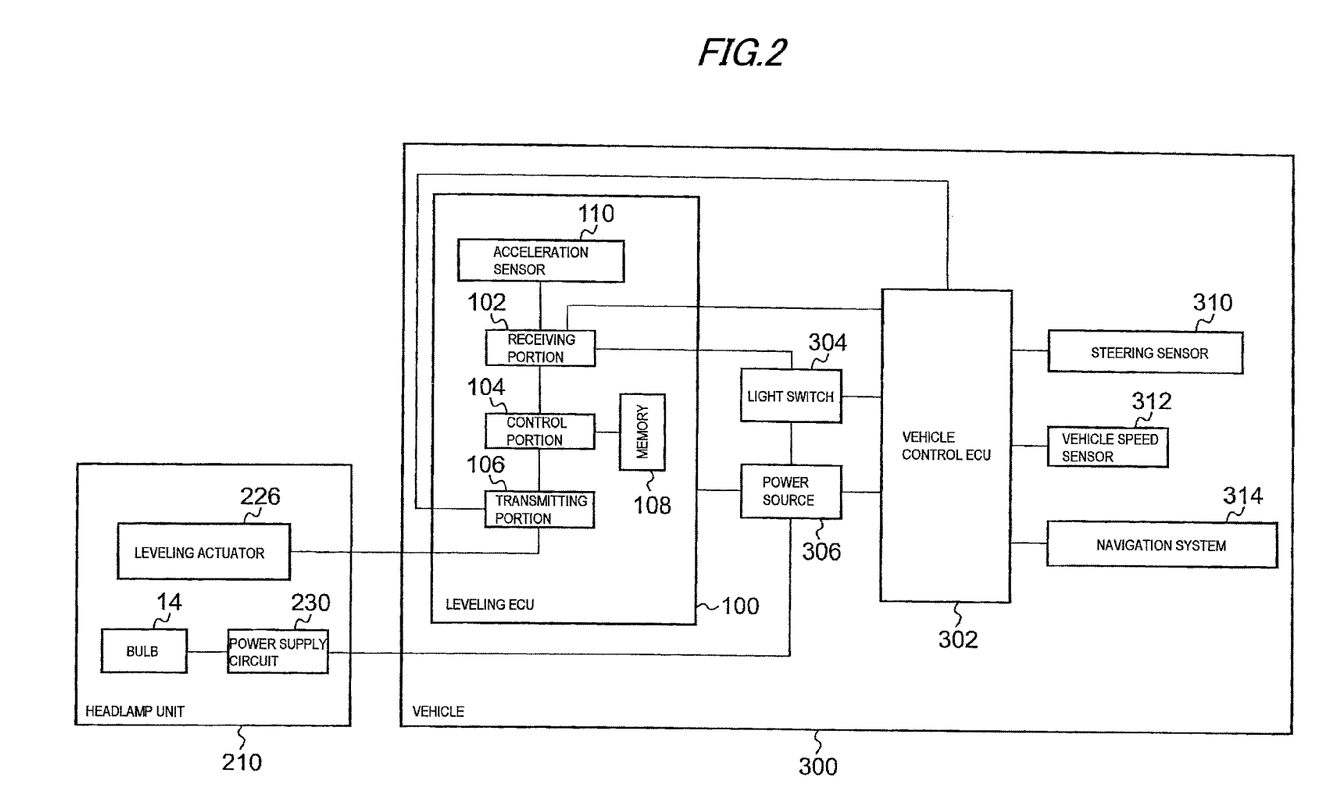
FIG. 2 is a function block diagram to explain an operation linkage of an auto leveling control between a headlamp unit, a vehicle control ECU and a leveling ECU.

FIG. 2 is a function block diagram to explain the operation linkage of the auto leveling control between a headlamp unit, a vehicle control ECU and a leveling ECU. Here, as described above, since the right and left headlamp units 210R and 210L are basically the same in structure, in FIG. 2, the right and left headlamp units 210E and 210L are gathered into a headlamp unit 210. Also, a leveling ECU 100, in terms of hardware, can be realized by devices such as the CPU and memories of a computer and/or circuits and, in terms of software, can be realized by computer programs or the like. In FIG. 2, the leveling ECU 100 is drawn as function blocks which can be realized by linking them with each other. Therefore, persons skilled in the art can understand that these function blocks can be realized in various forms by combination of hardware and software.

The leveling ECU 100 (vehicle lamp control apparatus) includes a receiving portion 102, a control portion 104, a transmitting portion 106, a memory 108 and an acceleration sensor 110. The leveling ECU 100 is installed, for example, in the neighboring portion of the dash board of a vehicle 300. Here, the installation position of the leveling ECU 100 is not limited to any specific position but, for example, the leveling ECU 100 may also be provided within the headlamp unit 210. To the leveling ECU 100, there are connected a vehicle control ECU 302 and a light switch 304 respectively carried onboard the vehicle 300. Signals from the vehicle control ECU 302 and light switch 304 are received by the receiving portion 102 respectively. The receiving portion 102 also receives the output values of the acceleration sensor 110.

To the vehicle control ECU 302, there are connected a steering sensor 310, a vehicle speed sensor 312, a navigation system 314 and the like. The vehicle control ECU 302 obtains various pieces of information from these sensors and the like and transmits them to the leveling ECU 100 or the like. For example, the vehicle control ECU 302 transmits the output values of the vehicle speed sensor 312 to the leveling ECU 100, whereby the leveling ECU 100 can detect that the vehicle 300 is accelerating or decelerating. Also, the light switch 304, according to the operation contents of a driver, transmits a signal for instructing the turn-on or -off of the headlamp unit 210, a signal for instructing the light distribution pattern to be formed by the headlamp unit 210, a signal for instructing the execution of the auto leveling control or other similar signals to the power source 306, vehicle control ECU 302, leveling ECU 100 and the like. For example, the light switch 304 transmits to the leveling ECU 100 a signal for instructing the execution of the auto leveling control, whereby the leveling ECU 100 starts the auto leveling control.

The signal received by the receiving portion 102 is transmitted to the control portion 104. The control portion 104, according to the output value of the acceleration sensor 110 transmitted from the receiving portion 102 and, as the need arises, information stored in the memory 108, derives a variation in the inclination angle of the vehicle 300 to generate a control signal for instructing the optical axis adjustment of the lamp unit 10. The control unit generated by the control portion 104 is transmitted from the transmitting portion 106 to the leveling actuator 226. The leveling actuator 226 is driven according to the received control signal to thereby adjust the optical axis O of the lamp unit 10 in the vertical direction (pitch angle direction) of the vehicle. Also, the control portion 104 generates auto leveling control stop information (which will be discussed later) and stores it into the memory 108, and also generates a signal for instructing the turn-on of an indicator (not shown). The signal for instructing the turn-on of the indicator is transmitted from the transmitting portion 106 to the vehicle control ECU 302.

The vehicle 300 carries thereon the power source 306 for supplying power to the leveling ECU 100, vehicle control ECU 302 and headlamp unit 210. When the turn-on of the headlamp unit 210 is instructed by the operation of the light switch 304, power is supplied from the power source 306 through the power supply circuit 230 to the bulb 14.

Figure 3A:
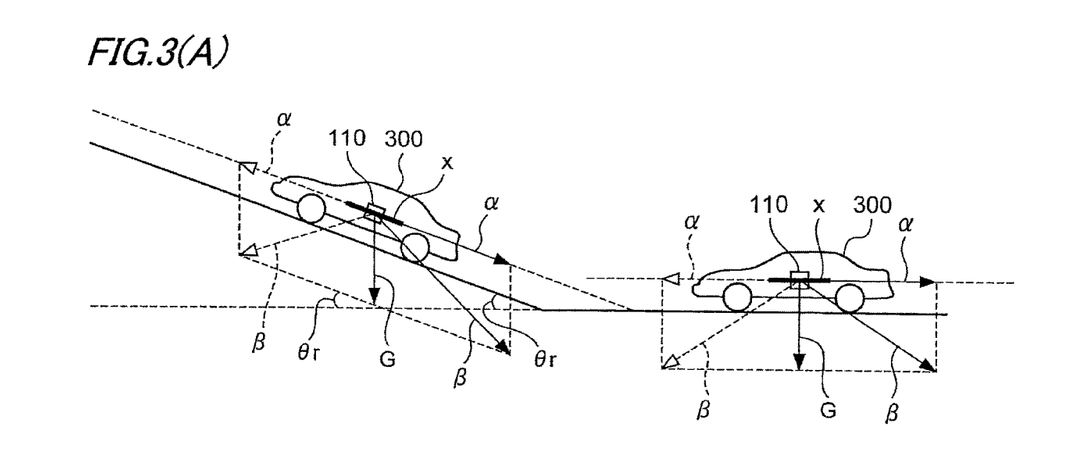
FIG. 3(A) and FIG. 3(B) are respectively typical views to explain a relationship between a direction of a motion acceleration vector of a vehicle and an attitude angle of the vehicle.
Figure 3B:
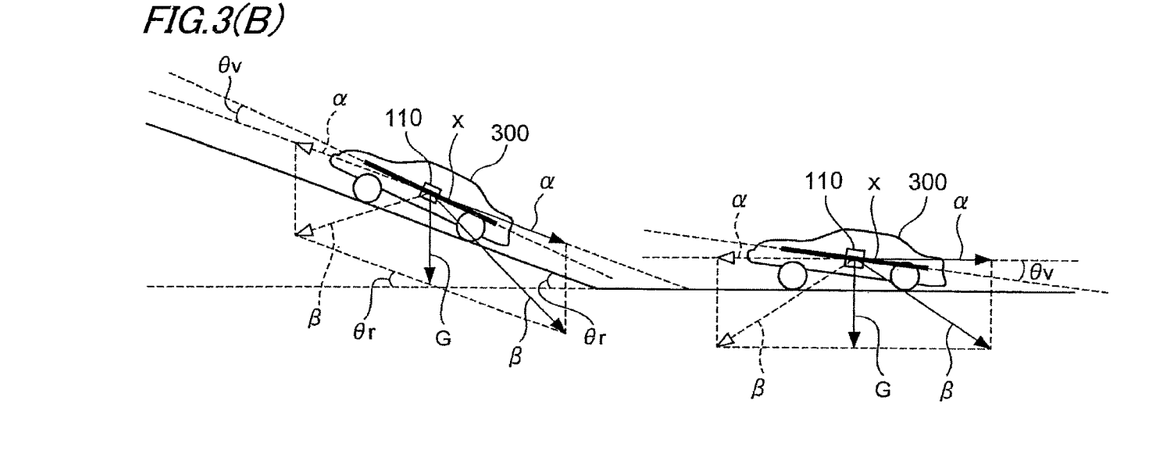

Next, description will be given below specifically of the auto leveling control to be carried out by the leveling ECU 100 having the above-mentioned structure. FIG. 3(A) and FIG. 3(B) are respectively typical views to explain the relationship between the direction of the motion acceleration vector of a vehicle and the attitude angle of the vehicle.

Figure 4:
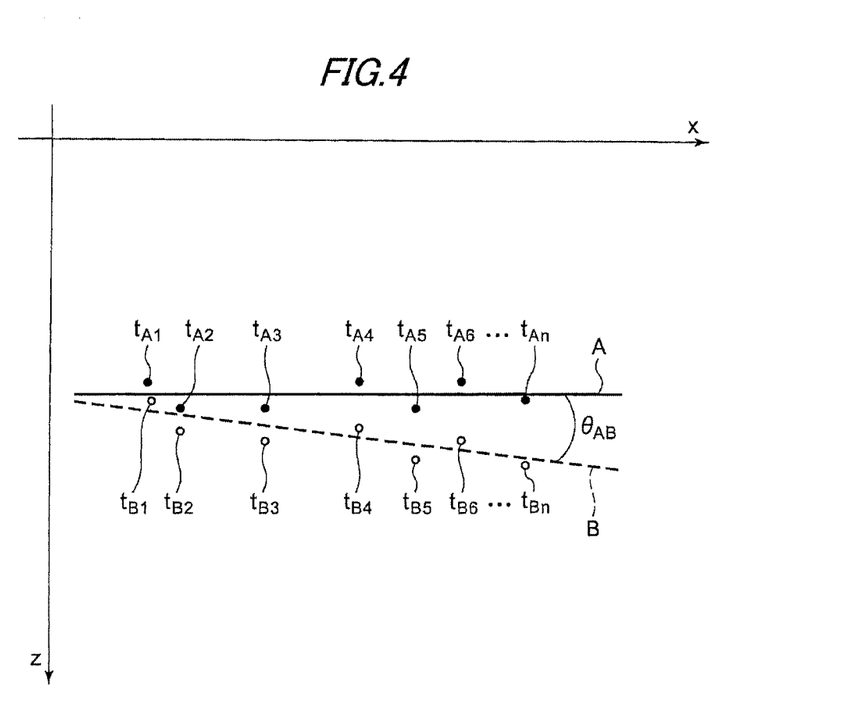
FIG. 4 is a view to explain a variation in an inclination of a straight line corresponding to a relationship between a vehicle longitudinal direction acceleration and a vehicle vertical direction acceleration.
Figure 5:
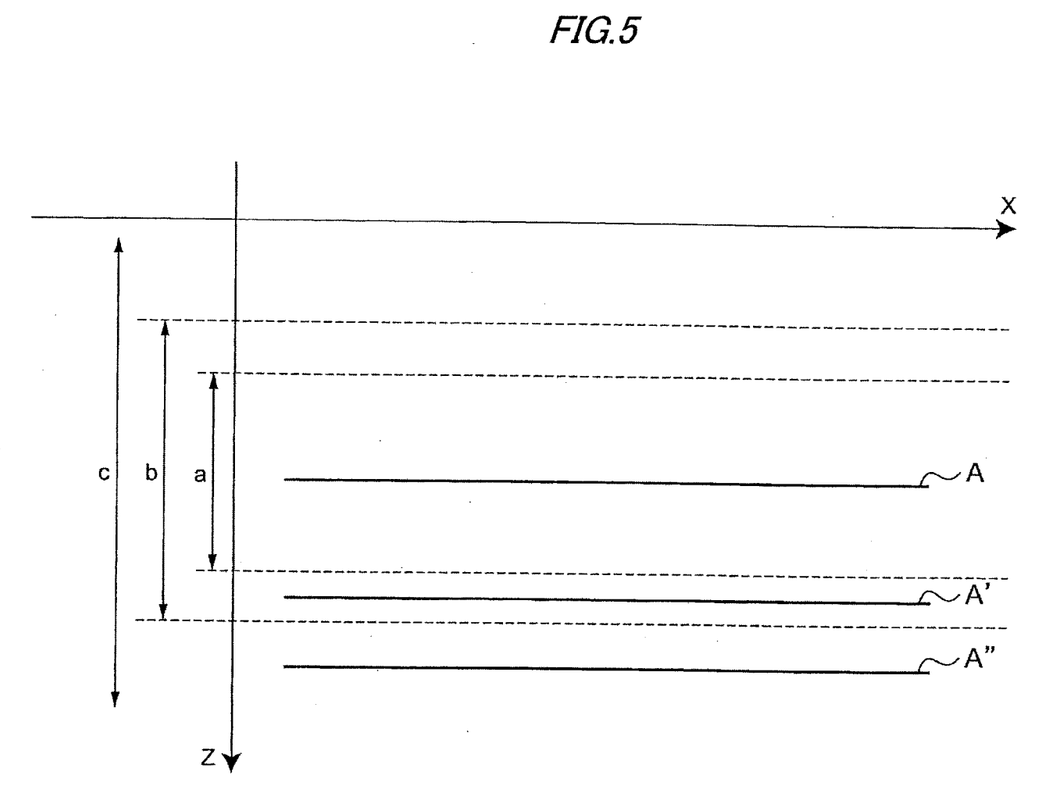
FIG. 5 is an explanatory view of variations in intercepts of the straight line corresponding to the relationship between the vehicle longitudinal direction acceleration and the vehicle vertical direction acceleration.

Specifically, FIG. 3(A) shows a state where a vehicle attitude angle θv (which will be discussed later) has not varied, whereas FIG. 3(B) shows a state where the vehicle attitude angle θv has varied. Also, in FIG. 3(A) and FIG. 3(B), a motion acceleration vector α and a composite acceleration vector β generated when the vehicle 300 advances are designated by solid line arrows respectively, whereas a motion acceleration vector α and a composite acceleration vector β generated when the vehicle 300 moves back are designated by broken line arrows respectively. FIG. 4 is a view to explain a variation in the inclination of a straight line showing the relationship between the vehicle longitudinal direction acceleration and the vehicle vertical direction acceleration. FIG. 5 is an explanatory view of variations in the intercepts of a straight line, showing the relationship between the vehicle longitudinal direction acceleration and the vehicle vertical direction acceleration.

For example, when a baggage is loaded in the baggage room of the vehicle or an occupant is seated in the rear seat of the vehicle, the vehicle takes a backwardly inclined attitude; and, when the baggage is unloaded or the occupant gets off, the vehicle is inclined forwardly from the backwardly inclined attitude. The illuminating direction of the lamp unit 10 also is varied vertically correspondingly to the attitude of the vehicle 300, whereby the forward illumination distance of the lamp unit 10 increases or decreases. Therefore, the leveling ECU 100 derives a variation in the inclination angle of the vehicle in the pitch direction from the output value of the acceleration sensor 110 and controls the leveling actuator 226 to thereby adjust the pitch angle of the optical axis O to an angle corresponding to the vehicle attitude. Thus, by carrying out the auto leveling control in which the leveling adjustment of the lamp unit 10 is made real time according to the vehicle attitude, even when the vehicle attitude varies according to the use state of the vehicle, the reach distance of the forward illumination can be adjusted to the optimum.

Also, in the acceleration sensor 110, there is a possibility that its output value can suffer from an error factor under its actual using environment. Such error factor can be, for example, a temperature drift in which the output value of the acceleration sensor 110 can be varied due to the varying temperature of the use environment. Also, such error factor can also be the position deviation of the acceleration sensor 110 which is caused by a time series type factor such a shock applied to the acceleration sensor 110 due to the movement of the vehicle 300, a human factor such as the contact of a maintenance man with the acceleration sensor 110 possibly occurring in the maintenance of the vehicle 300. When such error factor occurs in the acceleration sensor 110, it can be hard to carry out the auto leveling control properly. Therefore, the control portion 104 detects the error factor of the output value occurring in the acceleration sensor 110 according to the output values of the acceleration sensor 110 to thereby correct the optical axis position of the lamp unit 10. This correction can be made by the control portion 104 generating a correction signal for correcting the optical axis position and transmitting it to the leveling actuator 226. Or, this correction may also be made by correcting the output value of the acceleration sensor 110 and, based on the corrected output value, generating a control signal for adjusting the optical axis position. Or, this correction may also be made by setting a correction coefficient corresponding to the variation amount of the second axis intercept and generating a control signal for adjusting the optical axis position according to the output value of the acceleration sensor 110 using the set correction coefficient. This can reduce the possibility that the glare caused by the occurrence of the error factor in the acceleration sensor 110 can be given to other vehicles. Thus, higher-performance auto leveling control can be realized.

Here, the acceleration sensor 110 is, for example, a three-axis acceleration sensor having an X axis, a Y axis and a Z axis intersecting each other at right angles. The acceleration sensor 110 is mounted on the vehicle 300 in such a manner that its X axis extends along the longitudinal axis of the vehicle 300, its Y axis extends along the right and left axis of the vehicle 300 and its Z axis extends along the vertical axis of the vehicle 300. The acceleration sensor 110, while the vehicle 300 is stopping, detects the inclination of the vehicle 300 relative to a gravity acceleration vector G and outputs the numeric values of the respective axis components of the gravity acceleration vector G in the three axis directions. Thus, from the output values of the acceleration sensor 110, there can obtained, as a vector, a sum angle θ, namely, the inclination angle of the vehicle relative to the horizontal plane, containing a road surface angle θr, namely, the inclination angle of the road surface relative to the horizontal plane, and a vehicle attitude angle θv, namely, the inclination angle of the vehicle relative to the road surface. Also, the acceleration sensor 110, while the vehicle 300 is moving, detects a composite acceleration vector β in which the gravity acceleration vector G and a motion acceleration vector a generated due to the movement of the vehicle 300 are combined together, and outputs the numeric values of the respective axis components of the composite acceleration vector β in the three axis directions. Here, the road surface angle θr, vehicle attitude angle θv and sum angle θ are respectively angles in the vertical direction on the X axis, in other words, the angles of the vehicle 300 in the pitch direction. Also, in the following description, the Y axis direction component of the acceleration sensor 110, that is, the angle of the vehicle 300 in the rolling direction is not taken into consideration.

The object of the auto leveling control is to absorb a variation in the forward illumination distance of the vehicle lamp caused by a variation in the pitch direction inclination angle of the vehicle to thereby maintain the forward reach distance of the radiation light in the optimum. Therefore, the vehicle inclination angle necessary in the auto leveling control is the vehicle attitude angle θv. That is, the control should be made in such a manner that, when the vehicle attitude angle θv varies, the optical axis position of the lamp unit 10 should be adjusted and, when the road surface angle θr varies, the optical axis position of the lamp unit 10 should be maintained.

To realize this, information about the vehicle attitude, angle θv must be extracted from the sum angle θ that can be obtained from the acceleration sensor 110.

Here, the vehicle 300 moves parallel to the road surface. Thus, the motion acceleration vector a becomes parallel to the road surface regardless of the vehicle attitude angle θv. As shown in FIG. 3(A), when the vehicle attitude angle θv of the vehicle 300 is 0°, theoretically, the X axis of the acceleration sensor 110 becomes parallel to the road surface and, therefore, the motion acceleration vector α becomes parallel to the X axis of the acceleration sensor 110. Thus, the locus of the leading end of the composite acceleration vector β to be detected by the acceleration sensor 110 when the motion acceleration vector α is varied in size due to the acceleration or deceleration of the vehicle 300 provides a straight line parallel to the X axis. On the other hand, as shown in FIG. 3(B), when the vehicle attitude angle θv of the vehicle 300 is not 0°, the X axis of the acceleration sensor 110 deviates obliquely relative to the road surface and, therefore, the motion acceleration vector α provides a vector extending obliquely relative to the X axis of the acceleration sensor 110. Thus, the locus of the leading end of the composite acceleration vector β when the motion acceleration vector α is varied in size due to the acceleration or deceleration of the vehicle 300 provides a straight line inclined relative to the X axis.

Then, the control portion 104 receives the vehicle longitudinal direction acceleration and vehicle vertical direction acceleration from the acceleration sensor 110 through the receiving portion 102. And, the control portion 104, as shown in FIG. 4, plots the output values of the acceleration sensor 110 at least in one of the vehicle acceleration and deceleration times of the vehicle in a time series manner on coordinates where the vehicle longitudinal direction acceleration is set on a first axis (x axis) and the vehicle vertical direction acceleration is set on a second axis (z axis). Points tA1~tAn are the output values of the acceleration sensor 110 in the time t1~tn in a state shown in FIG. 3(A). Points tB1~tBn are the output values of the acceleration sensor 110 in the time t1~tn in a state shown in FIG. 3(B). Then, the control portion 104 derives a straight line from at least two of the plotted points and calculates the inclination of this straight line. In this embodiment, the control portion 104 applies the least square method or the like to the plotted multiple points tA1~tAn, tB1~tBn to find approximate straight lines (straight line approximate expressions) A, B and calculates the inclinations of the approximate straight lines.

When the vehicle attitude angle θv is 0°, from the output values of the acceleration sensor 110, there is obtained the approximate straight line A parallel to the x axis. That is, the inclination of the approximate straight line A is 0. On the other hand, when the vehicle attitude angle θv is not 0°, from the output values of the acceleration sensor 110, there is obtained the approximate straight line B having an inclination corresponding to the vehicle attitude angle θv. Therefore, by measuring a variation in the inclination of the above straight line in the acceleration or deceleration time of the vehicle 300, a variation in the vehicle attitude angle θv can be derived. And, the control portion 104, according to the thus derived, vehicle attitude angle θv, generates a control signal for adjusting the optical axis position.

Also, when the above-mentioned output value error factor occurs in the acceleration sensor 110, the second axis intercept (z axis intercept) of the straight line varies correspondingly to the error factor. Thus, the control portion 104, as an error factor based on the output values of the acceleration sensor 110, detects an error factor according to a variation in the second axis intercept of the above-mentioned approximate straight line to thereby correct the optical axis position of the lamp unit 10. For example, as shown in FIG. 5, when the second axis intercept of the approximate straight line A varies due to the temperature drift occurring in the acceleration 110, it varies in a range b wider than a range a where it is allowed to vary due to a variation in the inclination angle of the vehicle 300 relative to the horizontal plane. Also, when the second axis intercept varies due to a position deviation occurring in the acceleration sensor 110, it varies in a range c wider than the range b where it is allowed to vary due to the temperature drift. The range a, where the second axis intercept is allowed to vary due to the variation in the inclination angle of the vehicle 300 relative to the horizontal plane, is, for example, in angle conversion, a range of ±30°, while the range b allowable for the temperature drift, is, for example, in angle conversion, a range of ±35°. Also, the range c allowable for the position deviation is, for example, in angle conversion, a range exceeding±35°.

Therefore, when the second axis intercept exists within the range a, the acceleration sensor 110 is supposed to be normal; however, in this area, there is a possibility that the temperature drift or position deviation has occurred. Also, an area existing within the range b and outside the range a is an area where the temperature drift or position deviation occurred.

Thus, in this embodiment, when the second axis intercept exists within the range a (approximate straight line A in FIG. 5), it is assumed that no error factor has occurred in the acceleration sensor 110. Also, when the second axis intercept exists within the range b and outside the range a (approximate straight line A' in FIG. 5), it is assumed that, as the error factor, the temperature drift has occurred in the acceleration sensor 110. Further, when the second axis intercept exists within the range c and outside the range b (approximate straight line A'' in FIG. 5), it is assumed that, as the error factor, the position deviation has occurred in the acceleration sensor 110.

When the variation amount of the second axis intercept is included in such range allowable for the temperature drift as exceeds the range allowable for the variation in the inclination angle of the vehicle 300 (that is, in the case of the variation amount that allows the second axis intercept after varied to exist within the range b and outside the range a), the control portion 104 corrects the optical axis position of the lamp unit 10 to approach the initial set position. Thus, even when the optical axis position of the lamp unit 10 cannot be adjusted with high precision due to the occurrence of the temperature drift, the optical axis position can be made to approach the initial set position to thereby be able to realize a fail-safe function which can secure the visibility of the driver.

Also, when the variation amount of the second axis intercept is contained in such range allowable for the position deviation as exceeds the range allowable for the temperature drift of the acceleration sensor 110 (that is, in the case of the variation amount that allows the second axis intercept after varied to exist within the range c and outside the range b), the control portion 104 corrects the optical axis position of the lamp unit 10 to approach its initial set position. Also, in the case of the position deviation, since there is a low possibility that the acceleration sensor 110 can return to a proper position automatically, the control portion 104 makes the correction of the optical axis, position and then stops the generation of a control signal for instructing the adjustment of the optical axis position. Therefore, even when the optical axis position of the lamp unit 10 cannot be adjusted with high accuracy due to the occurrence of the position deviation, the optical axis position can be made to approach the initial set position to thereby be able to realize a fail-safe function for securing the visibility of the driver. Also, the continuous execution of the accuracy-lowered auto leveling control can be prevented.

In the above control, the assumption of the occurrence of the error factor in the acceleration sensor 110 is made based on the variation amount of the second axis intercept relative to a given reference value. That is, when the variation amount is an amount allowing the second axis intercept after varied to be contained in the range a, it is assumed that no error factor has occurred; when the variation amount is an amount allowing the second axis intercept after varied to be contained within the range b and outside the range a, it is assumed that the temperature drift has occurred; and, when the variation amount is an amount allowing the second axis intercept after varied to be contained within the range c and outside the range b, it is assumed that the position deviation has occurred. The above-mentioned expression "a given reference value" is, for example, the value of the second axis intercept of an approximate straight line when the vehicle 300 is set in a reference state which will be discussed later. However, the error factor assuming method is not limited to this specially but the error factor may also be assumed according to the value of the second axis intercept of the approximate straight line after varied. Also, the temperature drift amount may also be calculated from the integration of the variation amount of the second axis intercept.

And, also when the inclination of the approximate straight line varies according to a variation in the vehicle attitude angle θv, the position of the second axis intercept varies. Thus, the control portion 104 may also detect the error factor according to the variation of the second axis intercept from which the variation component of the second axis intercept based on the variation of the inclination of the straight line is subtracted. This makes it possible to detect the error factor with higher accuracy.

Here, the above-mentioned expression "to make the optical axis position approach the initial set position" contains "to make the optical axis position coincide with the initial set position" and "to make the optical axis position shift toward the initial set position by a given amount". Also, the above-mentioned expressions "the range allowable for the variation in the inclination angle of the vehicle 300", "the range allowable for the temperature drift", and "the range allowable for the position deviation" respectively mean the range set on the assumption that the second axis intercept is allowed to exist due to the variation in the inclination angle of the vehicle 300, the range set on the assumption that the second axis intercept is allowed to exist due to the temperature drift, and the range set on the assumption that the second axis intercept is allowed to exist due to the position deviation. These ranges can be set properly according to an experiment or simulation by a designer. Also, in the above control, the error factor is detected according to the variation in the second axis intercept of the approximate straight line. However, since the position of the approximate straight line can be determined when the inclination thereof and an arbitrary point, for example, a first axis intercept are determined, the second axis intercept can be found from the inclination and the arbitrary point. Therefore, when the error factor is detected according to the inclination and arbitrary point of the approximate straight line, substantially, the error factor is detected according to a variation in the second axis intercept of the approximate straight line. Thus, the detection of the error factor according to the variation in the second axis intercept in this embodiment contains the detection of the error factor according to such variation of the inclination and arbitrary point of the approximate straight line. Or, in this embodiment, the detection of the error factor according to the variation in the second axis intercept contains the error factor detection in which the residual value of the vehicle vertical direction acceleration (residual acceleration) when the vehicle longitudinal direction acceleration is 0 is derived from the approximate straight line and the error factor is detected according to a variation in the derived residual value.

The acceleration sensor 110 of this embodiment carries out, for example, the following auto leveling control according to variations in the inclination and intercept of the above approximate straight line. That is, for example, in the manufacturing factory of a vehicle manufacturer, the maintenance factory of a dealer or the like, the vehicle 300 is set on the horizontal plane, which is considered as the reference state of the vehicle 300. The reference state is, for example, a state where a person is seated on the driving seat of the vehicle 300. Also, in the reference state, the peripheral temperature of the acceleration sensor 110 is maintained at the reference temperature (for example, 25° C.). And, through the switch operation of an initialization processing apparatus provided in a factory or through communication using a CAN (Controller Area Network) system or the like, an initializing signal is transmitted to the leveling ECU 100. The control portion 104, on receiving the initializing signal through the receiving portion 102, starts the initial aiming adjustment and sets the optical axis O of the lamp unit 10 to the initial set position. Also, the vehicle 300 set in the reference state is accelerated or decelerated. The control portion 104, during the acceleration or deceleration of the vehicle 300, receives the vehicle longitudinal direction and vehicle vertical direction acceleration from the acceleration sensor 110, and plots the output values of the acceleration sensor 110 on coordinates where the vehicle longitudinal direction acceleration is expressed on a first axis and the vehicle vertical direction acceleration is expressed on a second axis. And, the control portion 104 finds a reference approximate straight line from the multiple plotted points and calculates the inclination and second axis intercept of the reference approximate straight line. The control portion 104 stores the found inclination and second axis intercept into the memory 108 as reference values.

In a state where the vehicle 300 is actually in use, the control portion 104 plots a given time at least in the acceleration and deceleration times and the output values of the acceleration sensor 110 on the coordinates to find an approximate straight line, and calculates the inclination and second axis intercept of this approximate straight line. And, when the current variation amount of the second axis intercept of the vehicle relative to the previously stored reference value of the second axis intercept is contained in such range allowable for the temperature drift as exceeds a range allowable for the variation of the inclination angle of the vehicle 300, the control portion 104 corrects the optical axis position to approach the initial set position.

Also, when the variation amount of the second axis intercept contained in such a range allowable for the position deviation as exceeds a range allowable for the temperature drift, the control portion 104 corrects the optical axis position to approach the initial set position and also stops the generation of the control signal. Specifically, the control portion 104, on detecting the position deviation, corrects the optical axis position to approach the initial set position. Also, the control portion 104 generates a signal for instructing the turn-on of an indicator. This signal is transmitted to the vehicle control ECU 302 by the transmitting portion 106, and the indicator is turned on by the vehicle control ECU 302 to thereby inform a user of the abnormal state of the auto leveling control. Also, the control portion 104 generates auto leveling control stop information and stores it into the memory 108. From this time on, even when instructions to execute the auto leveling control are given by the operation of the light switch 304 or the like, in the case that the leveling control stop information is read out from the memory 108, the control portion 104 avoids the execution of the auto leveling control. On receiving a reset signal through a switch operation in the maintenance factory of a dealer or through the communication of the CAN system, the control portion 104 erases or nullifies the auto leveling control stop information and transmits to the vehicle control ECU 302 a signal to instruct the turn-off of the indicator to thereby recover the auto leveling control to its executable state.

Also, when the variation amount of the second axis intercept is contained in a range allowable for a variation in the inclination angle of the vehicle 300 relative to the horizontal plane, the control portion 104 derives the vehicle attitude angle θv from the previously stored inclination reference value and the current inclination of an approximate straight line in the vehicle 300. And, the control portion 104 makes an optical axis adjustment using the derived vehicle attitude angle θv. Here, an angle (in FIG. 4, $\theta_{AB}$) formed between the reference approximate straight line and an approximate straight line calculated under the actual use state of the vehicle corresponds to the vehicle attitude angle θv.

Figure 6:
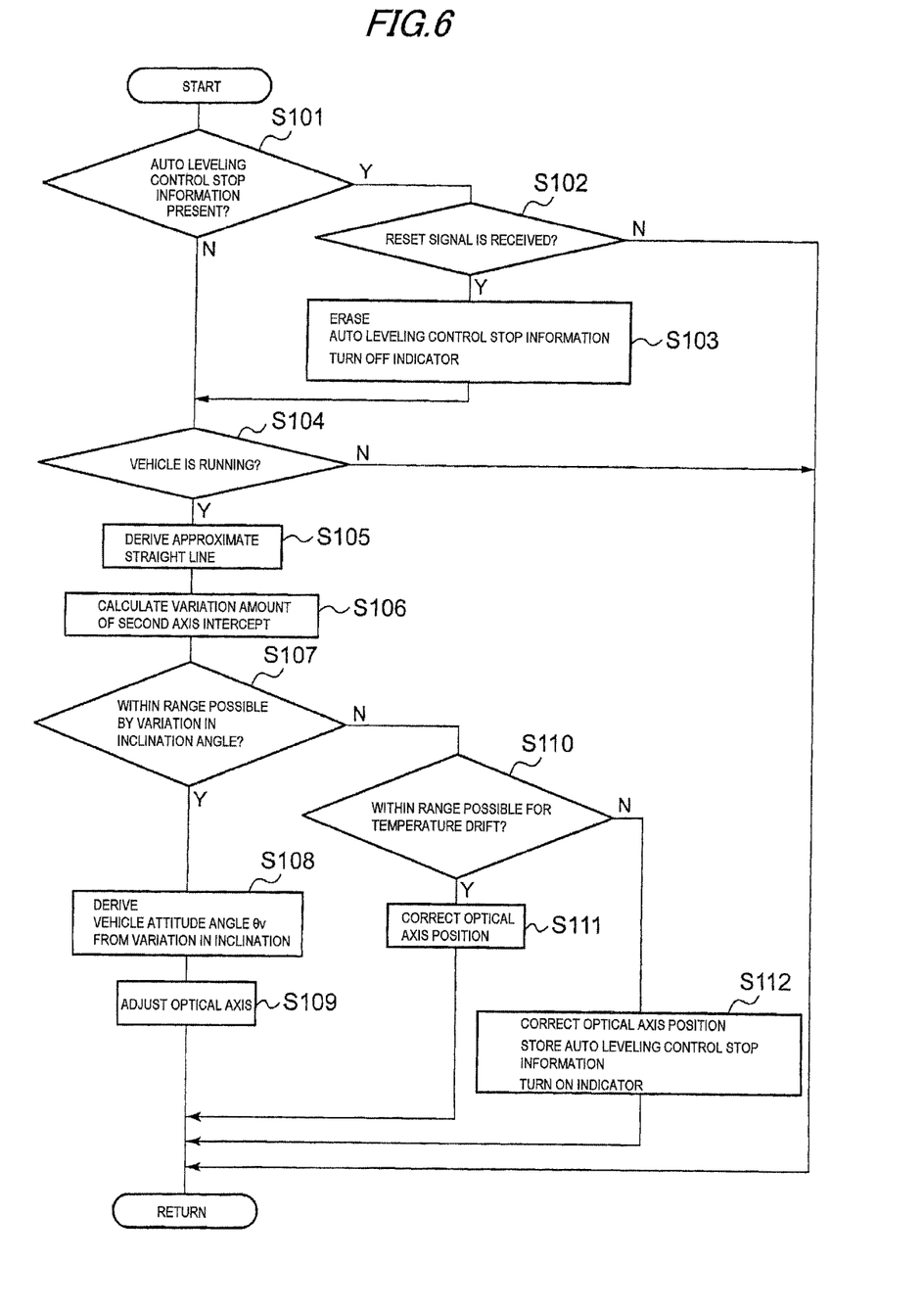
FIG. 6 is a flow chart of the auto leveling control to be carried out by the leveling ECU according to the embodiment 1.

FIG. 6 is a flow chart of auto leveling control to be carried out by the leveling ECU according to the embodiment 1. In the flow chart of FIG. 6, the processing procedures of the respective parts are expressed by combinations of S (the initial letter of Step) meaning a step and numerals. Also, in a processing expressed by a combination of S and a numeral, there is executed a certain decision procedure. When the decision result is positive, Y (the initial letter of Yes) is added to express, for example, (Y of S101) and, when the decision result is negative, N (the initial letter of No) is added to express, for example, (N of S101). This flow is carried out repeatedly at given timing by the control portion 104 of the leveling ECU 100 when, in a state where instructions for execution of the auto leveling control are given, for example, by the light switch 304, the ignition is turned on; and, when the ignition is turned off, the flow is ended.

Firstly, the control portion 104 checks whether the auto leveling control stop information is stored in the memory 108 or not (S101). When the auto leveling control stop information is stored (Y of S101), the control portion 104 checks whether a reset signal is received or not (S102). When the reset signal is received (Y of S102), the control portion 104 erases the auto leveling control stop information and turns off the indicator (S103). When the reset signal is not received (N of S102), the control portion 104 ends this routine.

When the auto leveling control stop information is not stored (N of S101), or when the auto leveling control stop information is erased and the indicator is turned off (S103), the control portion 104 checks whether the vehicle 300 is moving or not (S104). When the vehicle 300 is not moving (N of S104), the control portion 104 ends this routine. When the vehicle 300 is moving (Y of S104), the control portion 104 derives an approximate straight line from the output value of the acceleration sensor 110 (S105) and calculates the variation amount of the second axis intercept of the derived approximate straight line relative to the second axis intercept of the previously stored reference approximate straight line (S106).

The control portion checks whether the calculated variation amount of the second axis intercept is contained in a range allowable for a variation in the inclination angle of the vehicle 300 (S107). When the calculated variation amount of the second axis intercept is contained in this range (Y of S107), the control portion 104 derives the vehicle attitude angle θv from a variation in the inclination of the derived approximate straight line relative to the inclination of the reference approximate straight line (S108), adjusts the optical axis according to the derived vehicle attitude angle θv (S109), and ends this routine. When the calculated variation amount of the second axis intercept is not contained in this range (N of S107), the control portion 104 checks whether the variation amount of the second axis intercept is contained in a range allowable for the temperature drift or not (S110). When the variation amount of the second axis intercept is contained in this range (Y of S110), the control portion controls the leveling actuator 226 to correct the optical axis position (S111) and ends this routine. When the variation amount of the second axis intercept is not contained in this range (N of S110), the control portion 104 controls the leveling actuator 226 to correct the optical axis position, generates auto leveling control stop information and stores it into the memory 108, turns on the indicator (S112), and ends this routine.

As described above, the leveling ECU 100 illustrated as the vehicle lamp control apparatus according to this embodiment detects an error factor occurring in the output values of the acceleration sensor 110 based on the output values of the acceleration sensor 110 to thereby correct the optical axis position of the lamp unit 10. This can enhance the safety of the auto leveling control and thus higher-performance auto leveling control can be carried out. Also, as the temperature drift measures, there may be employed a method using an acceleration sensor having a temperature correction function for correcting an error in the output values due to the temperature drift. However, such acceleration sensor is relatively expensive and the number of kinds thereof is limited. Therefore, in this method, there is a possibility that the cost can increase and the freedom of design can be degraded. On the other hand, in this embodiment, since the temperature drift is detected according to the output values of the acceleration sensor 110, such increased cost and degraded design freedom can be avoided.

Also, the leveling ECU 100 plots, in a time series manner, the output values of the acceleration sensor 110 at least in one of the acceleration and deceleration times of the vehicle 300 on coordinates where the vehicle longitudinal direction acceleration is set on its first axis and the vehicle vertical direction acceleration is set on its second axis, derives a straight line from at least two of the plotted points and detects an error factor according to a variation in the second axis intercept of the derived straight line. Thus, in this embodiment, since the error factor is detected using the actual data of the acceleration sensor 110, when compared with the error factor detection using the sum angle θ obtained by converting the output values of the acceleration sensor 110, the error factor can be detected with high sensitivity.

The invention is not limited to the above embodiment but modifications such as various design changes are also possible based on the knowledge of persons skilled in the art, while embodiments with such modifications added thereto are also included in the range of the invention. A new embodiment constituted of a combination of the above embodiment and the following modifications can provide the respective effects of the embodiment and modifications to be combined together.

In the above embodiment 1, the control portion 104 makes the optical axis adjustment by deriving a variation in the vehicle attitude angle θv from a variation in the inclination of an approximate straight line. However, the optical axis adjustment may also be made, for example, in the following manner. That is, since, while the vehicle is moving, the carrying load quantity or the number of occupants rarely increases or decreases and thus the vehicle attitude angle θv rarely varies, a variation in the sum angle θ during the moving operation of the vehicle can be assumed to be a variation in the road surface angle θr. On the other hand, since, while the vehicle is stopping, the vehicle 300 rarely moves and thus the road surface angle θr rarely varies, a variation in the sum angle θ during the stopping operation of the vehicle can be assumed to be a variation in the vehicle attitude angle θv. Thus, the control portion 104 may maintain the optical axis when the sum angle θ varies during the moving operation of the vehicle, while it may adjust the optical axis when the sum angle θ varies while the vehicle is stopping.

Specifically, the control portion 104 stores the output values of the acceleration sensor 110 when the vehicle 300 is set in the reference state into the memory 108 as the reference value of the road surface angle θr (θr=0°) and the reference value of the vehicle attitude angle θv (θv=0°). And, the control portion 104, when the sum angle θ varies while the vehicle is moving, avoids the generation of a control signal for instructing the optical axis adjustment. Or, the control portion 104 generates a control signal for instructing the maintenance of the optical axis position with respect to a variation in the sum angle θ while the vehicle is moving. And, while the vehicle is stopping, the control portion 104 subtracts the reference value of the vehicle attitude angle θv from the current sum angle θ to calculate the road surface angle θr in the vehicle stopping time, and stores this road surface angle θr into the memory 108 as the new reference value of the road surface angle θr. Also, the control portion 104, when the sum angle θ varies during the vehicle stopping time, subtracts the reference value of the road surface angle θr from the current sum angle θ to obtain the vehicle attitude angle θv, and makes the optical axis adjustment using this vehicle attitude angle θv. The obtained vehicle attitude angle θv is stored into the memory 108 as a new reference value.

In the above embodiment, the vehicle 300 may also include a temperature sensor which is used to detect the temperature of the acceleration sensor 110. In this case, the leveling ECU 100 may also detect the temperature drift of the acceleration sensor 110 from the output value of the acceleration sensor 110 and the output value of the temperature sensor. This makes it possible to detect the generation of the temperature drift with higher accuracy. Here, the acceleration sensor 110 may also detect the temperature drift only from the output value of the temperature sensor. Also, the vehicle 300 may also include a position deviation sensor which is used to detect the position deviation of the acceleration sensor 110. In this case, the leveling ECU 100 may also detect the position deviation from the output value of the acceleration sensor 110 and the output value of the position deviation sensor, or only from the output value of the position deviation sensor.

In the above embodiment, the acceleration sensor 110 is provided within the leveling ECU 100. However, the acceleration sensor 110 may also be provided outside the leveling ECU 100. Also, only the temperature drift or position deviation may be detected as the error factor.

In accordance with the above embodiment, a vehicle lamp control apparatus 100 may include: a receiving portion 102 adapted to receive output values of an acceleration sensor 110; a control portion 104 adapted to derive a variation in an inclination angle θv of a vehicle according to the output values of the acceleration sensor 110 and to generate a control signal for instructing an optical axis adjustment of a vehicle lamp 210; and a transmitting portion 106 adapted to transmit the control signal to an optical axis adjusting portion 226 of the vehicle lamp 210. The control portion 104 may detect an error factor of the output values occurring in the acceleration sensor 110 based on the output values of the acceleration sensor 110 and correct an optical axis position of the vehicle lamp 210.

According to this structure, in an auto leveling control of the vehicle lamp using the acceleration sensor, higher-performance auto leveling control can be carried out.

In the above structure, the receiving portion 102 may receive a vehicle longitudinal direction acceleration and a vehicle vertical direction acceleration from the acceleration sensor 110, the control portion 104 may plot the output values of the acceleration sensor 110 at least in one of an accelerating condition and a decelerating condition of the vehicle in a time series manner, on coordinates where the vehicle longitudinal direction acceleration is set on a first axis and the vehicle vertical direction acceleration is set on a second axis, so as to derive a straight line from at least two of plotted points, and the control portion 104 may determine the error factor based on a variation in a second axis intercept of the straight line.

According to this structure, higher-performance auto leveling control can be carried out.

In the above structure, the error factor may be a temperature drift of the acceleration sensor 110. The control portion 104 may move the optical axis position of the vehicle lamp 210 toward an initial set position, when the variation amount of the second axis intercept is within a range which is possibly occurred by the temperature drift and exceeding a range which is possibly occurred by a variation in the inclination angle of the vehicle.

According to this structure, there can be realized a fail-safe function which can secure the visibility of the driver when the temperature drift occurs.

In the above structure, the error factor may be a position deviation of the acceleration sensor 110. The control portion 104 may move the optical axis position of the vehicle lamp 210 toward the initial set position and to stop the generation of the control signal, when the variation amount of the second axis intercept is within a range which is possibly occurred by the position deviation and exceeding the range which is possibly occurred by a temperature drift of the acceleration sensor 110.

According to this structure, there can be realized a fail-safe function which can secure the visibility of the driver when the position deviation occurs.

In the above structure, the control portion 104 may determine the error factor based on a variation in the second axis intercept from which a variation component of the second axis intercept according to a variation in an inclination of the straight line is subtracted.

According to this structure, the error factor can be detected with higher accuracy.

DESCRIPTION OF REFERENCE NUMERALS AND SIGNS

| 0: Optical axis | 10: Lamp unit | 100: Leveling ECU |
|---|---|---|
| 102: Receiving portion | 104: Control portion | |
| 106: Transmitting portion | 110: Acceleration sensor | |
| 226: Leveling actuator | 300: Vehicle | |

What is claimed is:

1. A vehicle lamp control apparatus comprising:
a receiving portion adapted to receive output values of an acceleration sensor,
a control portion adapted to derive a variation in an inclination angle of a vehicle based on the output values of the acceleration sensor and to generate a control signal for instructing an optical axis adjustment of a vehicle lamp, and
a transmitting portion adapted to transmit the control signal to an optical axis adjusting portion of the vehicle lamp,
wherein the control portion is adapted to detect an error factor of the output values occurring in the acceleration sensor based on the output values of the acceleration sensor and to correct an optical axis position of the vehicle lamp,
wherein the receiving portion is adapted to receive a vehicle longitudinal direction acceleration and a vehicle vertical direction acceleration from the acceleration sensor,
wherein the control portion is adapted to plot the output values of the acceleration sensor at least in one of an accelerating condition and a decelerating condition of the vehicle in a time series manner, on coordinates where the vehicle longitudinal direction acceleration is set on a first axis and the vehicle vertical direction acceleration is set on a second axis, so as to derive a straight line from at least two of plotted points, and wherein the control portion is adapted to determine the error factor based on a variation in a second axis intercept of the straight line.

2. The vehicle lamp control apparatus according to claim 1, wherein the error factor is a temperature drift of the acceleration sensor, and wherein the control portion is adapted to move the optical axis position of the vehicle lamp toward an initial set position, when the variation amount of the second axis intercept is within a range which is possibly occurred by the temperature drift and exceeding a range which is possibly occurred by a variation in the inclination angle of the vehicle.

3. The vehicle lamp control apparatus according to claim 1, wherein the error factor is a position deviation of the acceleration sensor, and wherein the control portion is adapted to move the optical axis position of the vehicle lamp toward an initial set position and to stop a generation of the control signal, when the variation amount of the second axis intercept is within a range which is possibly occurred by the position deviation and exceeding a range which is possibly occurred by a temperature drift of the acceleration sensor.

4. The vehicle lamp control apparatus according to claim 2, wherein the error factor is a position deviation of the acceleration sensor, and wherein the control portion is adapted to move the optical axis position of the vehicle lamp toward the initial set position and to stop a generation of the control signal, when the variation amount of the second axis intercept is within a range which is possibly occurred by the position deviation and exceeding the range which is possibly occurred by a temperature drift of the acceleration sensor.

5. The vehicle lamp control apparatus according to claim 1, wherein the control portion is adapted to determine the error factor based on a variation in the second axis intercept from which a variation component of the second axis intercept according to a variation in an inclination of the straight line is subtracted.

6. The vehicle lamp control apparatus according to claim 2, wherein the control portion is adapted to determine the error factor based on a variation in the second axis intercept from which a variation component of the second axis intercept according to a variation in an inclination of the straight line is subtracted.

7. The vehicle lamp control apparatus according to claim 3, wherein the control portion is adapted to determine the error factor based on a variation in the second axis intercept from which a variation component of the second axis intercept according to a variation in an inclination of the straight line is subtracted.

8. The vehicle lamp control apparatus according to claim 4, wherein the control portion is adapted to determine the error factor based on a variation in the second axis intercept from which a variation component of the second axis intercept according to a variation in an inclination of the straight line is subtracted.

* * * * *